(12) United States Patent
Chang et al.

(10) Patent No.: US 7,152,443 B2
(45) Date of Patent: Dec. 26, 2006

(54) LOCKABLE CASE

(75) Inventors: Yun-Yi Chang, Nan-Tou (TW); Chien-Ta Lin, Nan-Tou Hsien (TW); Kuo-Kuang Liu, Nan-Tou Hsien (TW)

(73) Assignee: Universal Scientific Industrial Co., Ltd., Tsao-Tun Chen (TW)

( * ) Notice: Subject to any disclaimer, the term of this patent is extended or adjusted under 35 U.S.C. 154(b) by 0 days.

(21) Appl. No.: 11/032,825

(22) Filed: Jan. 10, 2005

(65) Prior Publication Data

US 2006/0150692 A1 Jul. 13, 2006

(51) Int. Cl.
*E05B 21/00* (2006.01)

(52) U.S. Cl. .......................... 70/352; 70/120; 292/170; 292/368; 292/371; 361/683

(58) Field of Classification Search .................... 70/81, 70/82, 77–79, 71, 72, 64–67, 58, 158–173, 70/41; 361/683; 312/223.2, 212, 215, 265.6; 292/74, 342, 41
See application file for complete search history.

(56) References Cited

U.S. PATENT DOCUMENTS

| | | | | | |
|---|---|---|---|---|---|
| 2,905,493 | A | * | 9/1959 | Tocchetto | ................. 292/37 |
| 3,792,884 | A | * | 2/1974 | Tutikawa | .................. 292/37 |
| 4,066,307 | A | * | 1/1978 | Barding | .................. 312/242 |
| 4,547,006 | A | * | 10/1985 | Castanier | .................. 292/37 |
| 6,601,884 | B1 | * | 8/2003 | Bastian | .................. 292/222 |
| 6,932,445 | B1 | * | 8/2005 | Chiu | .................. 312/221 |
| 2005/0185370 | A1 | * | 8/2005 | Chung | .................. 361/683 |

* cited by examiner

*Primary Examiner*—Brian E. Glessner
*Assistant Examiner*—William Schrode
(74) *Attorney, Agent, or Firm*—Christensen O'Connor Johnson Kindness PLLC

(57) ABSTRACT

A lockable case includes a base casing having two opposite first lateral walls, a top cover openably connected to the base casing, a slide block, and two slide bars disposed respectively on two opposite sides of the slide block. Each slide bar has an inner end, and a locking element to engage a corresponding first lateral wall. The slide block is disposed between the inner ends of the slide bars, and is movable between locking and unlocking positions that respectively prevents and permits inward movement of the slide bars. An actuating lever is connected pivotally to the slide block to move the slide block to the locking position. An elastic member is provided for biasing the slide block toward the unlocking position.

5 Claims, 9 Drawing Sheets

LOCKABLE CASE

BACKGROUND OF THE INVENTION

1. Field of the Invention

The invention relates to a lockable case for a computer or other devices.

2. Description of the Related Art

A housing of a conventional computer is generally fastened to a frame of the computer by means of a plurality of screws. Assembly and disassembly of the housing on the frame involve the use of a tool to fasten and loosen the screws, thereby making it difficult to service the conventional computer.

Referring to FIG. 1, another conventional computer is shown to include a frame 1, and a housing 2 mounted on the frame 1. The housing 2 includes a side plate 21 having a hole 22, and a locking device 3 disposed in the hole 22 and having a panel 31 which can be pulled by a user so as to open the side plate 21, as illustrated by phantom lines and designated by numeral 21'. Opening of the side plate 21 permits access to the frame 1.

Although the locking device 3 can achieve its intended purpose, a large portion of the locking device 3 is exposed on the side plate 21 such that it is easy for an intruder to destroy the locking device 3 and steal the components inside the frame 1 of the computer.

SUMMARY OF THE INVENTION

Therefore, the object of the present invention is to provide a lockable case having a locking assembly that is easy to operate and that is disposed inside the case so that it is not easily destroyed by a thief.

According to this invention, a lockable case comprises a base casing having two opposite first lateral walls, a top cover openably connected to the base casing, a slide block mounted on the top cover and slidable along a first direction, two slide bars disposed respectively on two opposite sides of the slide block and slidable along a second direction that is perpendicular to the first direction, an actuating lever, and an elastic member. The top cover has two opposite second lateral walls to overlap the first lateral walls. Each of the slide bars has an inner end and an outer end, and a locking element to engage one of the first lateral walls. The slide bars are movable toward each other to disengage the locking element from said one of the first lateral walls. The slide block is disposed between the inner ends of the slide bars, and is movable between a locking position that prevents inward movement of the slide bars and an unlocking position that permits inward movement of the slide bars. The actuating lever is connected pivotally to the slide block to move the slide block to the locking position. The elastic member is provided for biasing the slide block toward the unlocking position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
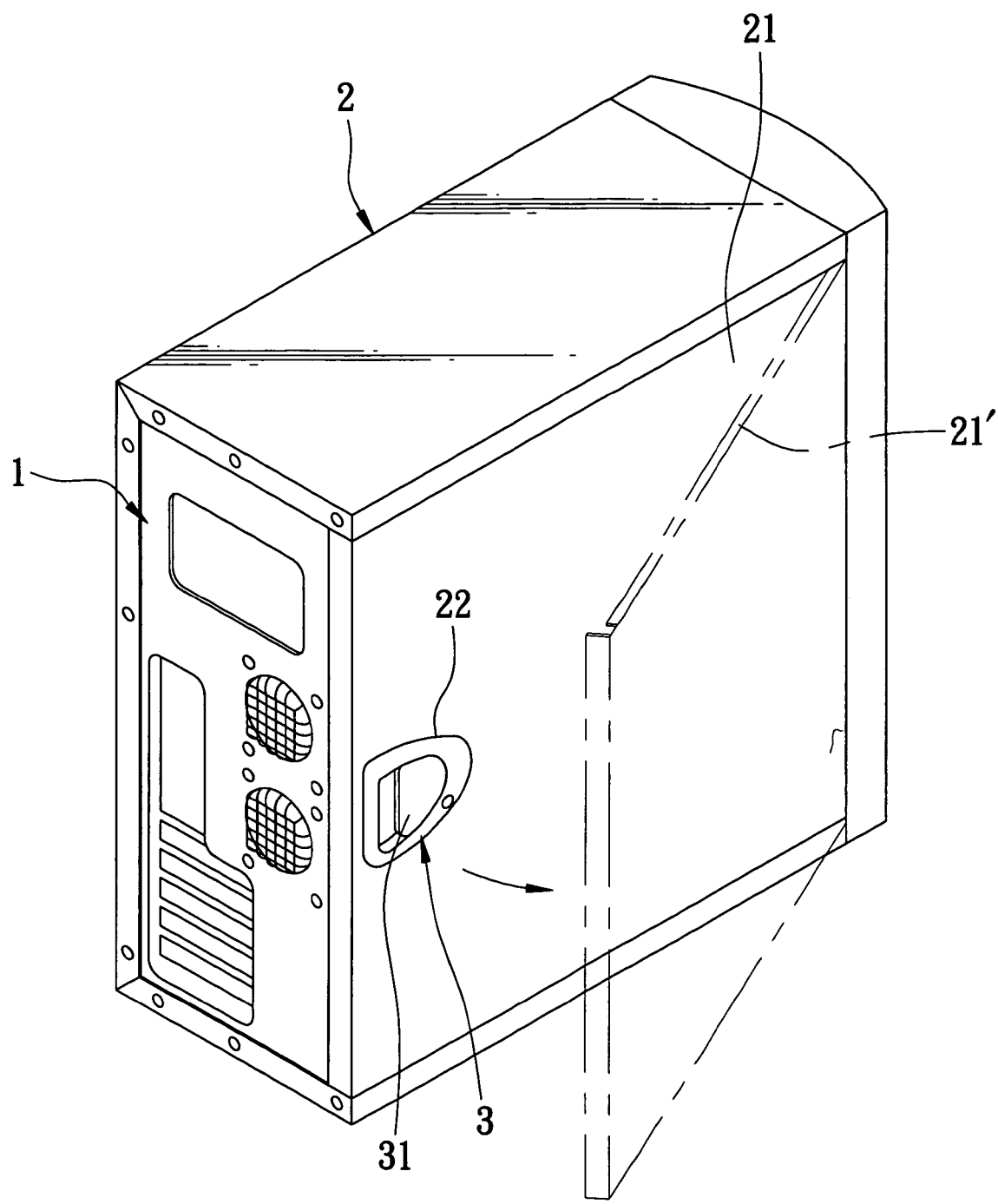
FIG. 1 is a perspective view of a conventional computer.
Figure 2:
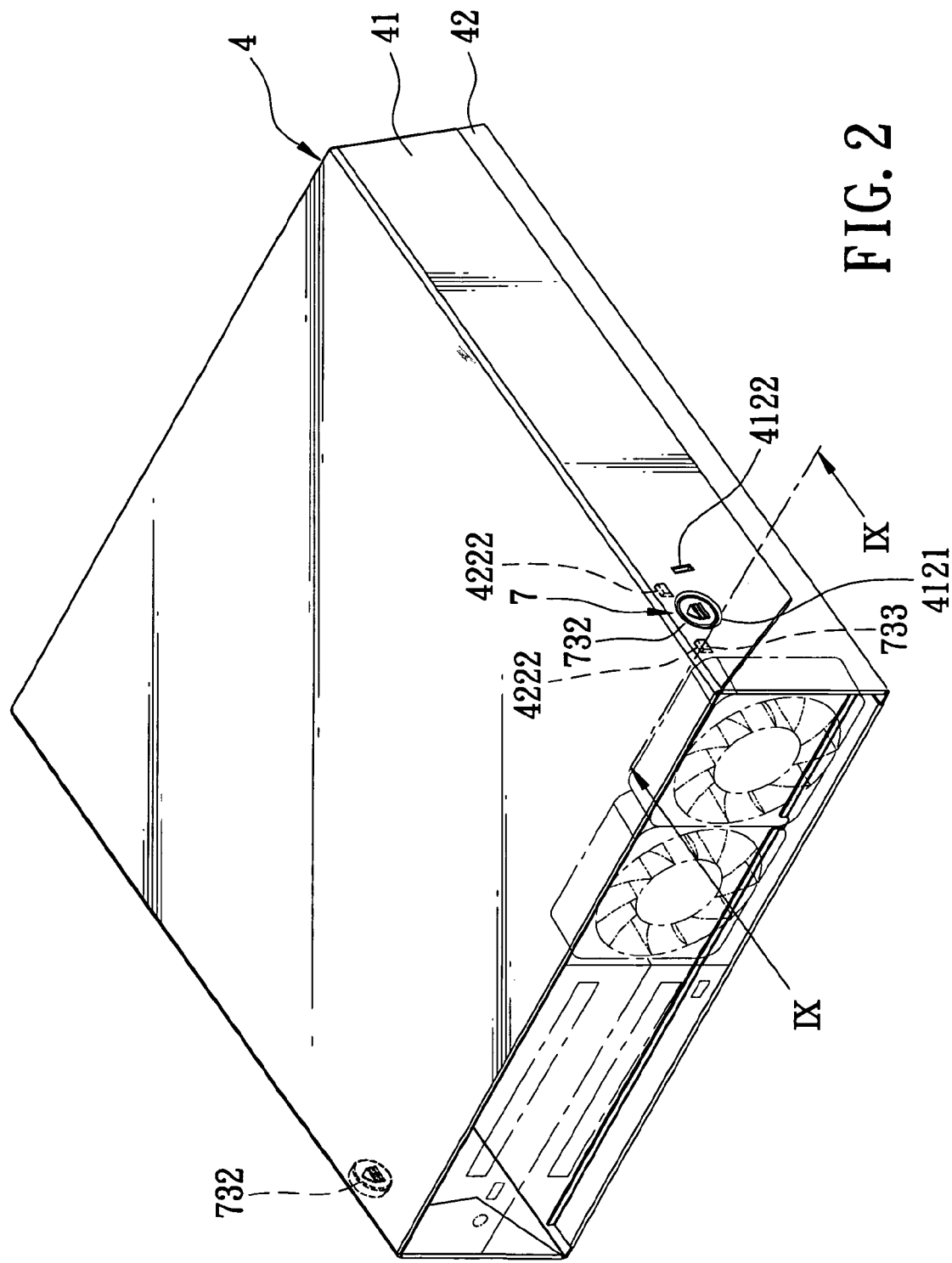
FIG. 2 is a perspective view of a lockable case of the present invention in a state of use.
Figure 3:
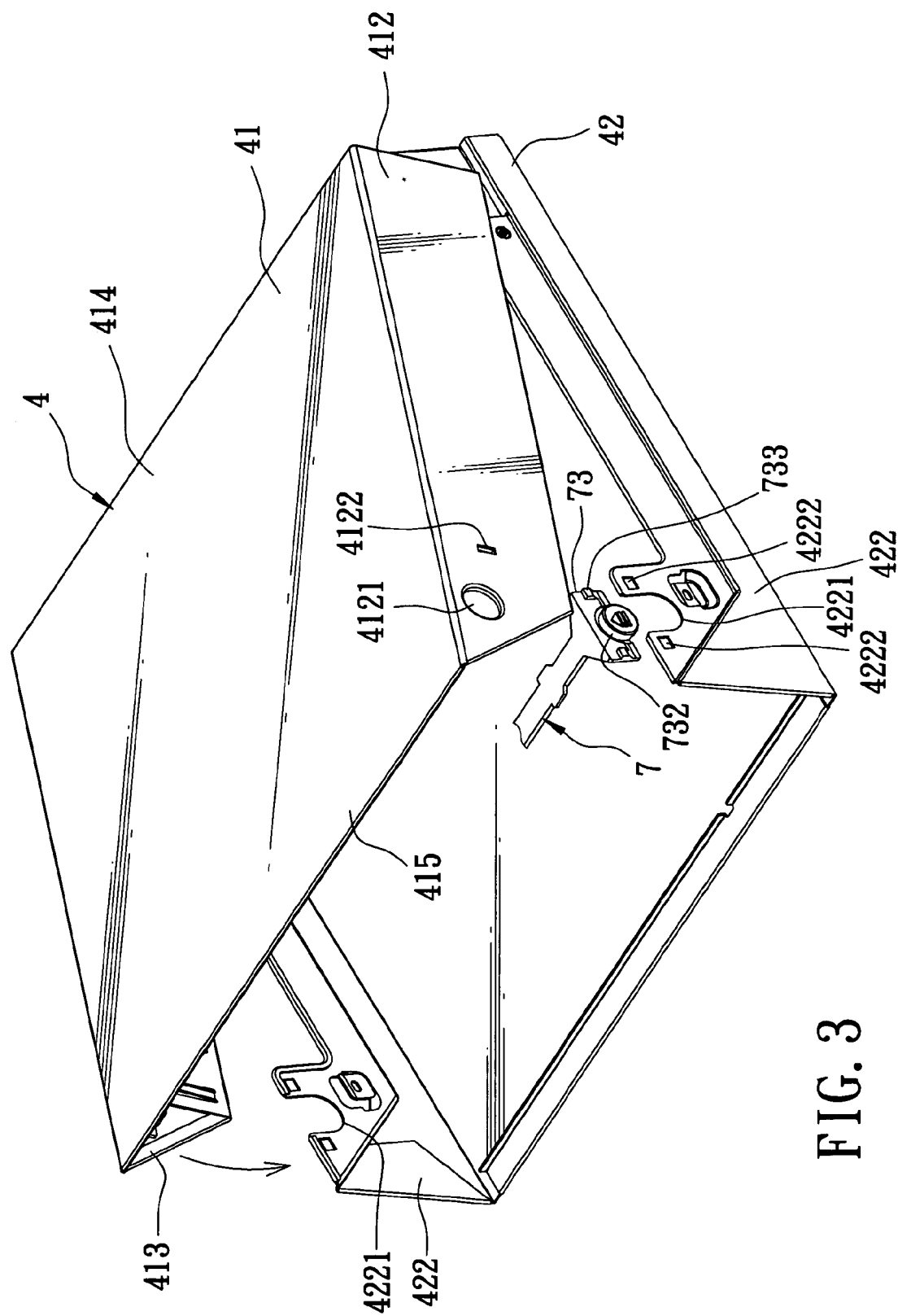
FIG. 3 is a perspective view of a top cover and a base casing of the preferred embodiment of the lockable case of the present invention.
Figure 4:
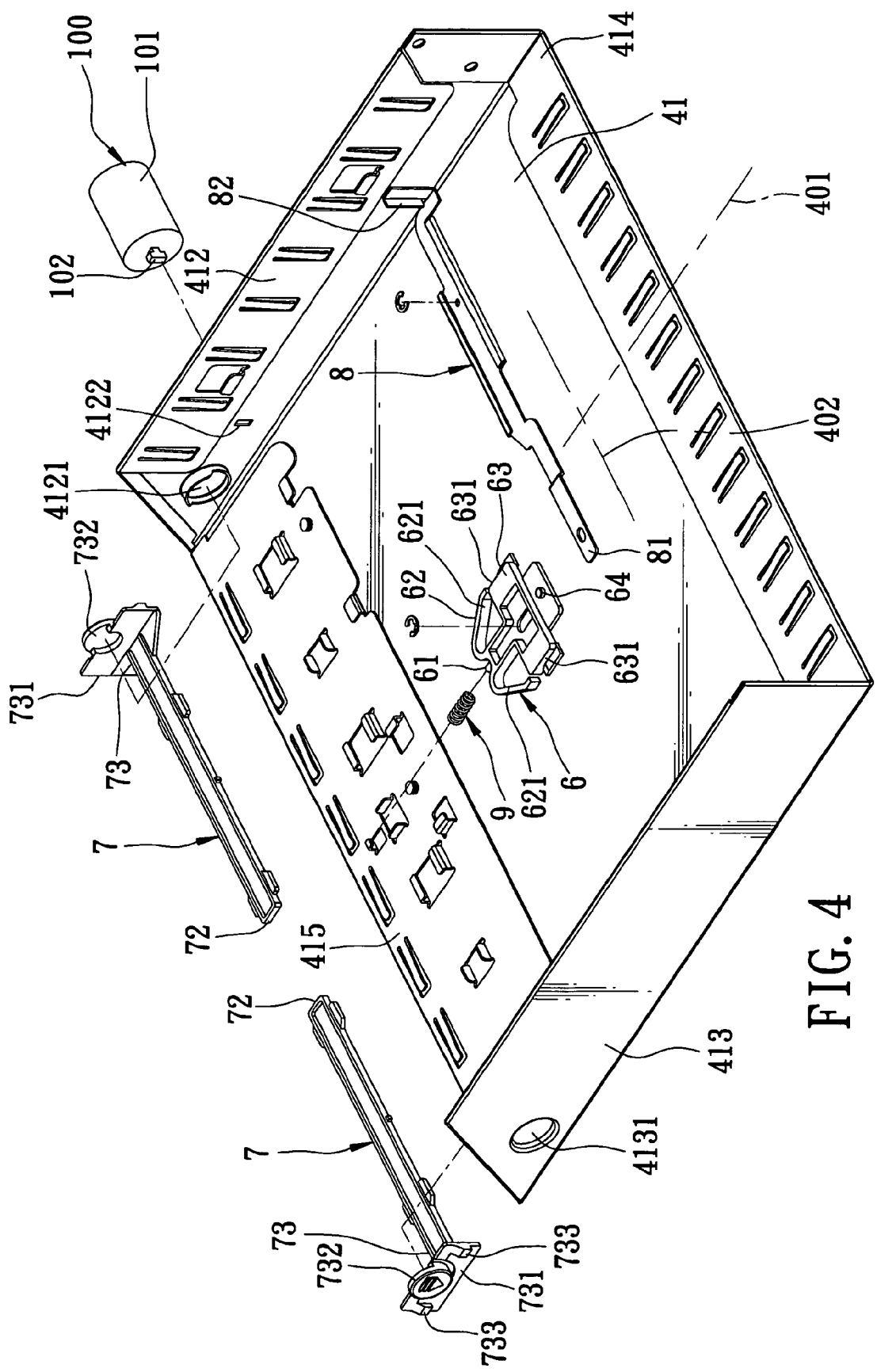
FIG. 4 is an exploded perspective view of a locking assembly of the preferred embodiment prior to assembly on a top cover.

Referring to FIGS. 2 to 4, the preferred embodiment of a lockable case 4 according to the present invention is shown to comprise a top cover 41, a base casing 42, and a locking assembly. The lockable case 4 in this embodiment is a computer case.

The top cover 41 includes two opposite second lateral walls 412, 413 extending downwardly and respectively from two opposite ends of the top cover 41, and front and rear end portions 414, 415. Each of the second lateral walls 412, 413 has a through hole 4121, 4131. The second lateral wall 412 further has a rectangular lock hole 4122 proximate to the through hole 4121.

The base casing 42 includes two opposite first lateral walls 422 extending upwardly and respectively from two opposite ends of the base casing 42. The second lateral walls 412, 413 overlap the first lateral walls 422 when the top cover 41 is in a closing position relative to the base casing 42. Each of the first lateral walls 422 has a substantially U-shaped notch 4221 formed on a rear end portion thereof, and two engaging holes 4222 respectively formed on two opposite sides of the notch 4221. The notch 4221 in each first lateral wall 422 is registered with the through hole 4121, 4131 in a respective one of the second lateral walls 412, 413 when the top cover 41 is in the closing position. The front end portion 414 of the top cover 412 is connected pivotally to a front end portion of the base casing 42.

The locking assembly is mounted on the rear end portion 415 of the top cover 41, and includes a slide block 6, two slide bars 7, an actuating lever 8, and an elastic member 9.

The slide block 6 is slidable along a first direction 401, and includes a resilient portion 62 having left and right wing members 621, a rear connecting portion 61, a non-resilient blocking portion 63, and a front connecting portion 64. The rear connecting portion 61 is in the form of a cylindrical pin, and is disposed on the resilient portion 62 between the left and right wing members 621. The non-resilient blocking portion 63 is disposed in front of the wing members 621. The front connecting portion 64 is disposed in front of the non-resilient blocking portion 63.

The slide bars 7 are disposed respectively on left and right sides of the slide block 6, and are slidable along a second direction 402 that is perpendicular to the first direction 401. Each of the slide bars 7 includes an inner end 72, an outer end 73, an upright plate 731 disposed on the outer end 73, a knob 732 connected to a central portion of the upright plate 731 and extending into the through hole 4121, 4131 in the corresponding second lateral wall 412, 413, and a locking element. The locking element includes two projections 733 projecting outwardly from the upright plate 731 and respectively disposed on two opposite sides of the knob 732. The projections 733 engage releasably the engaging holes 4222 in the corresponding first lateral wall 422 so as to connect fixedly the top cover 41 to the base casing 42.

Figure 5:
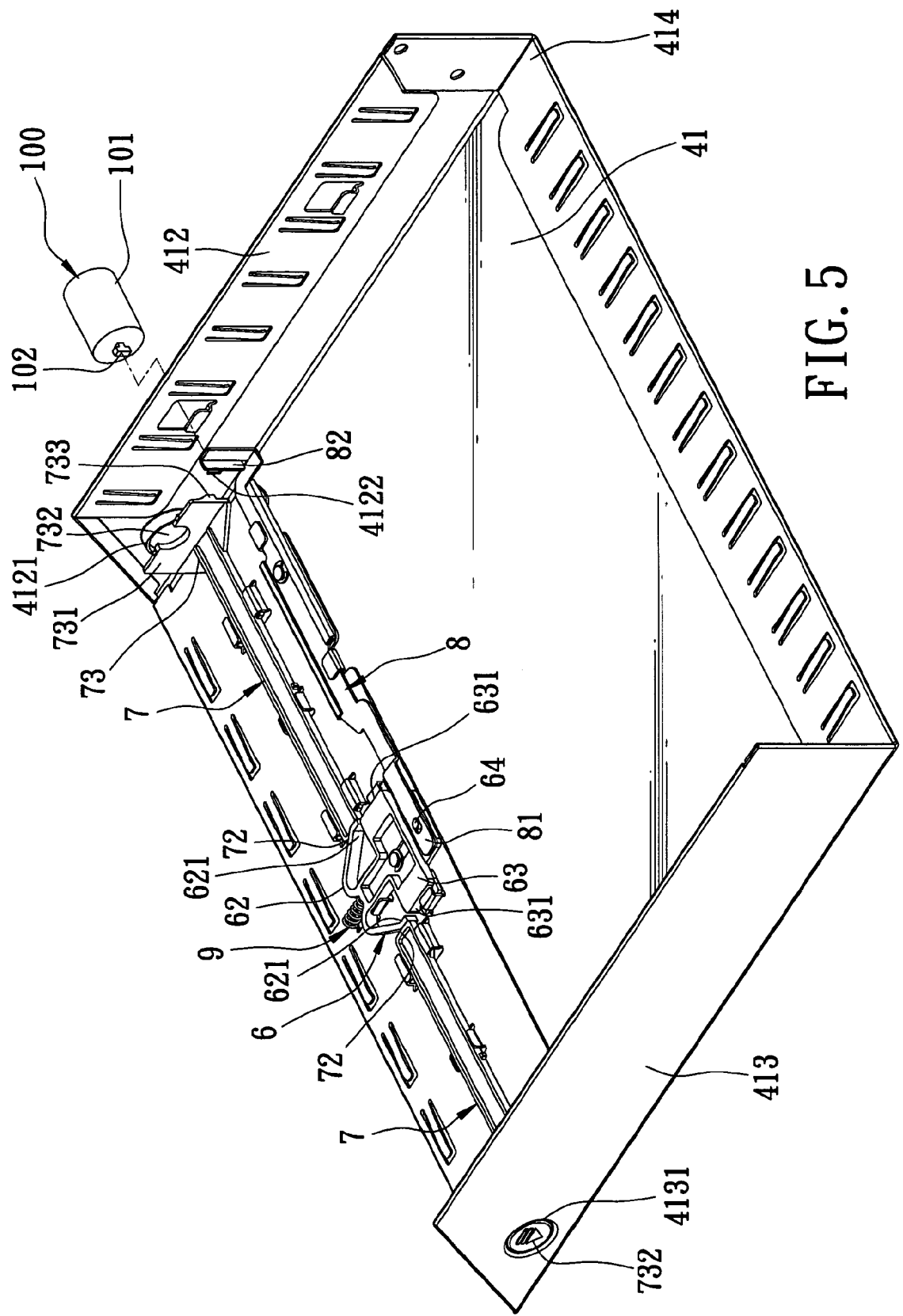
FIG. 5 is a perspective view of the locking assembly of FIG. 4 in an assembled state.
Figure 6:
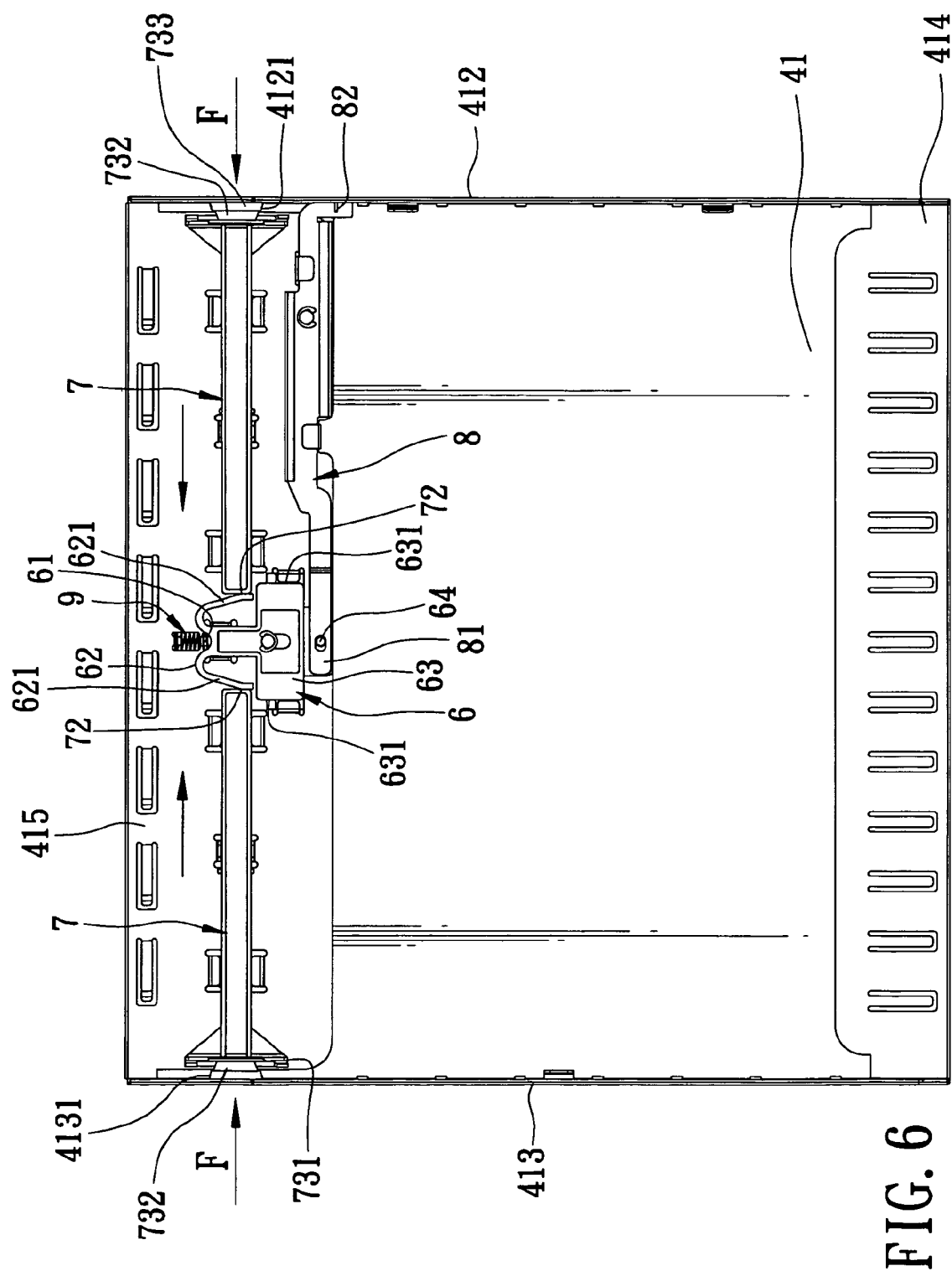
FIG. 6 illustrates a slide block of the locking assembly in an unlocking position.
Figure 7:
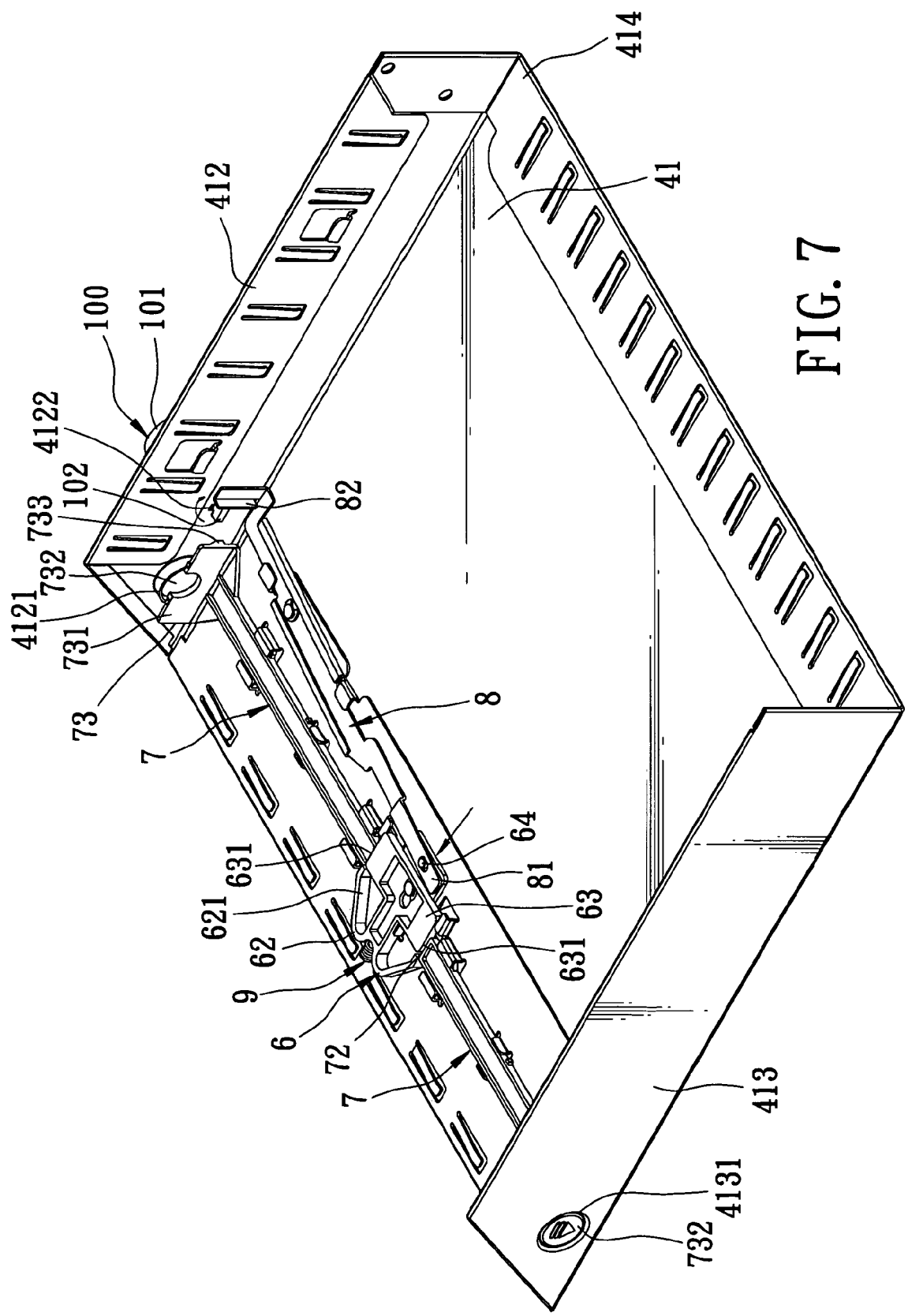
FIG. 7 illustrates the slide block of the locking assembly in a locking position.

The slide block 6 in this embodiment is disposed between the inner ends 72 of the slide bars 7, and is movable between a locking position and an unlocking position. In the locking position, as shown in FIG. 7, two opposite lateral edges 631 of the blocking portion 63 of the slide block 6 abut against the inner ends 72 of the slide bars 7 so that the slide bars 7 are prevented from moving toward each other. In the unlocking position, as shown in FIGS. 5 and 6, the left and right wing members 621 of the slide block 6 are in contact with the inner ends 72 of the slide bars 7. When external forces (F) (see FIG. 6) are applied to the knobs 732 of the slide bars 7, the inner ends 72 of the slide bars 7 compress the left and right wing members 621 of the slide block 6 so that the slide bars 7 move toward each other.

The actuating lever 8 includes a first end 81, and a second end 82 opposite to the first end 81. The first end 81 is connected pivotally to the front connecting portion 64 of the slide block 6 so as to enable indirect manipulation of the slide block 6 to the locking position as will be described below. The second end 82 is proximate to the lock hole 4122 in the second lateral wall 412 of the top cover 41.

The elastic member 9 has one end sleeved on the rear connecting portion 61 of the slide block 6, and the other end abutting against an inner face of the top cover 41. The elastic member 9 biases the slide block 6 toward the unlocking position.

The lockable case 4 of the present invention is further provided with an operating lock 100 to operate the actuating lever 8. The operating lock 100 includes a cylindrical main body 101, and a substantially T-shaped key element 102 projecting outwardly from the main body 101. The key element 102 can pass through the lock hole 4122 in the second lateral wall 412 of the top cover 41 to abut against an inner wall face of the second lateral wall 412. By rotating the main body 101, the key element 102 can push against the second end 82 of the actuating lever 8 so that it is displaced, the result of which is that the slide block 6 is moved to the locking position. To remove the key element 102 from the lock hole 4122, the main body 101 is rotated until the key element 102 registers with the lock hole 4122.

Figure 9:
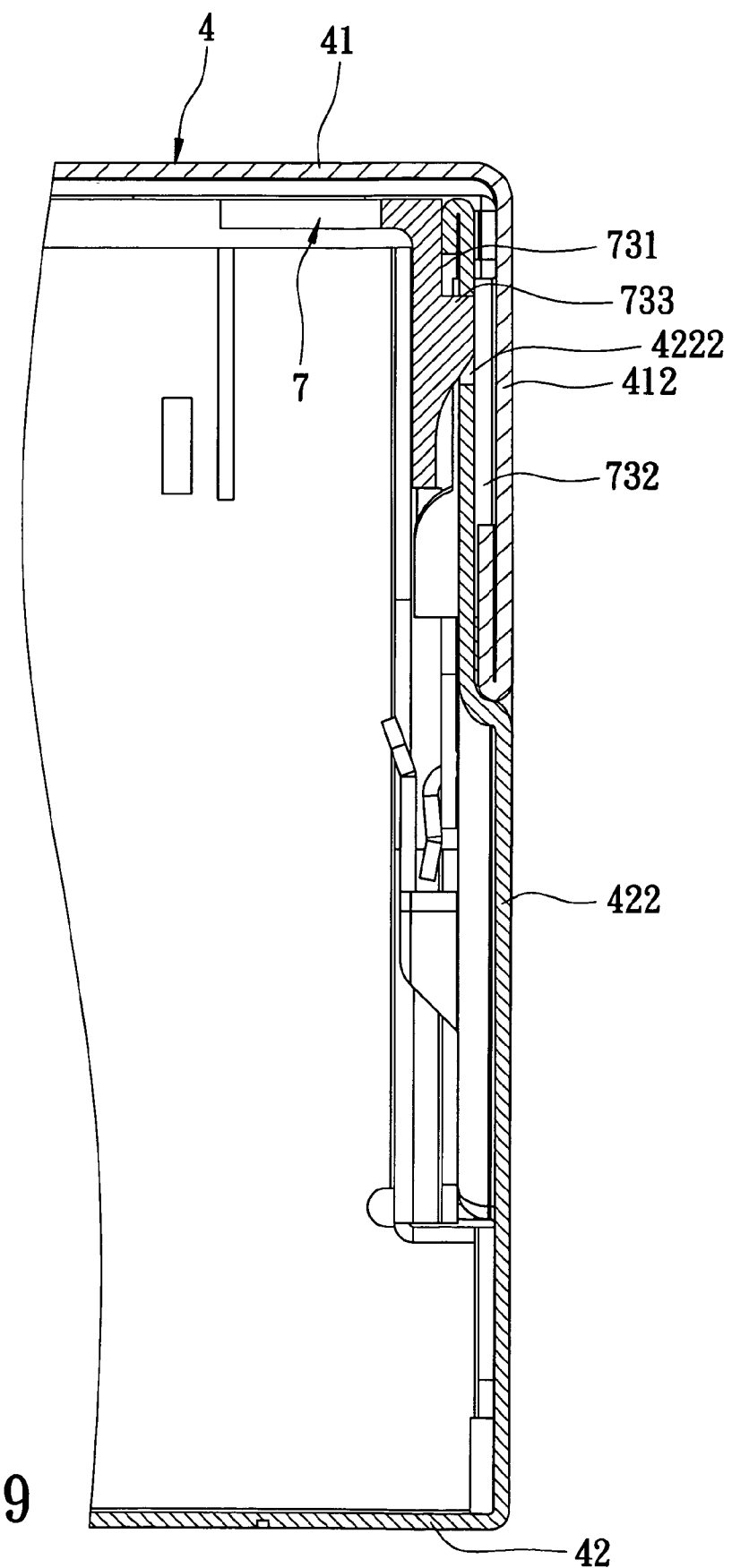
FIG. 9 is a fragmentary sectional view of the preferred embodiment taken along line IX—IX of FIG. 2.

With reference to FIGS. 2, 6 and 9, when the top cover 41 is connected to the base casing 42, the projections 733 on the upright plate 731 of each slide bar 7 engage the engaging holes 4222 in the corresponding first lateral wall 422. At the same time, the elastic member 9 biases the slide block 6 to the unlocking position so that the inner ends 72 of the slide bars 7 are in contact with the respective wing members 621 of the resilient portion 62 of the slide block 6. When the external forces (F) are applied to the knobs 732 of the slide bars 7, the inner ends 72 of the slide bars 7 move toward each other, and compress the wing members 621 of the slide block 6. The projections 733 disengage from the corresponding engaging holes 4222 at this time so that the top cover 41 can be opened pivotally relative to the base casing 42.

Figure 8:
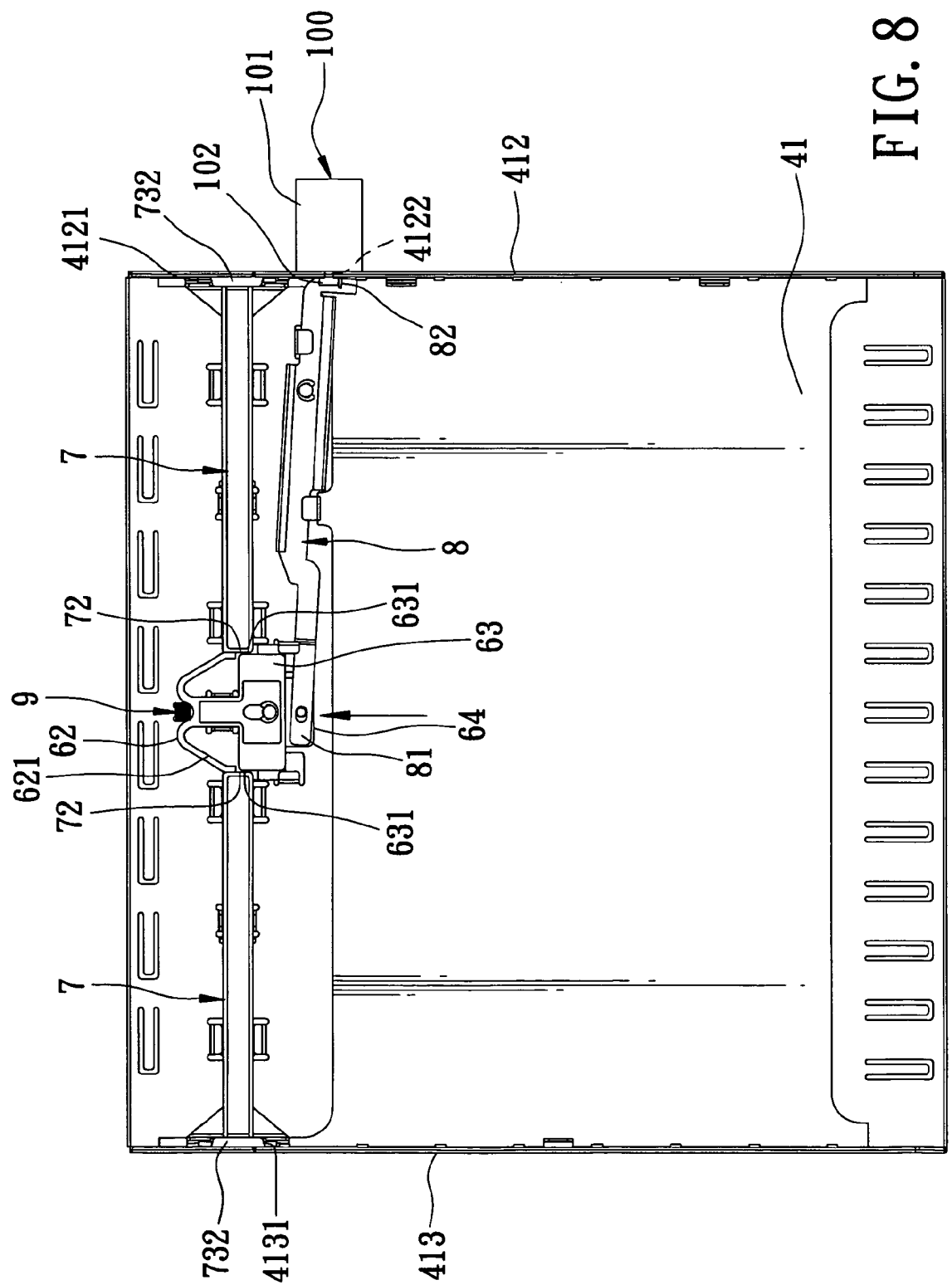
FIG. 8 illustrates how an operating lock operates an actuating lever of the locking assembly to move the slide block to the locking position.

With reference to FIGS. 7 and 8, to lock the slide block 6, the key element 102 of the operating lock 100 is first inserted into the lock hole 4122, after which the main body 101 of the operating lock 100 is rotated so as to operate the second end 82 of the actuating lever 8. This results in the movement of the slide block 6 to the locking position. The inner ends 72 of the slide bars 7 abut against the lateral edges 631 of the blocking portion 63 of the slide block 63 at this time. Hence, the knobs 732 of the slide bars 7 cannot be pressed inwardly, and the slide bars 7 cannot be moved toward each other, thereby preventing the opening of the top cover 41 relative to the base casing 42.

The advantages of the lockable case 4 of the present invention can be summarized as follows:

1. Through the use of the operating lock 100, the slide block 6 can be operated to move to either the unlocking position or the locking position. When the slide block 6 is in the unlocking position, the knobs 732 can be pressed inwardly so as to permit the user to open the top cover 41. These processes are easily performed by the user.

2. The locking assembly of the present invention, unlike the conventional locking device 3, is not largely exposed, and is thus not easily destroyed, thereby enhancing the anti-theft effect of the lockable case 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A lockable case comprising:
   a base casing having two opposite first lateral walls;
   a top cover openably connected to said base casing, and having two opposite second lateral walls to overlap said first lateral walls;
   a slide block mounted on said top cover and slidable along a first direction;
   two slide bars disposed respectively on two opposite sides of said slide block and slidable along a second direction that is perpendicular to said first direction, said slide bars each having an inner end and an outer end, and a locking element to engage one of said first lateral walls, said slide bars being movable toward each other to disengage said locking element from said one of said first lateral walls, said slide block being disposed between said inner ends of said slide bars, and being movable between a locking position that prevents inward movement of said slide bars and an unlocking position that permits inward movement of said slide bars;
   an actuating lever having a first end connected pivotally to said slide block to move said slide block to said locking position;
   an elastic member for biasing said slide block toward said unlocking position; and
   an operating lock to operate said actuating lever.

2. A lockable case comprising;
   a base casing having two opposite first lateral walls;
   a top cover openably connected to said base casing, and having two opposite second lateral walls to overlap said first lateral walls;
   a slide block mounted on said top cover and slidable along a first direction;
   two slide bars disposed respectively on two opposite sides of said slide block and slidable along a second direction that is perpendicular to said first direction, said slide bars each having an inner end and an outer end, and a locking element to engage one of said first lateral walls, said slide bars being movable toward each other to disengage said locking element from said one of said first lateral walls, said slide block being disposed between said inner ends of said slide bars, and being movable between a locking position that prevents inward movement of said slide bars and an unlocking position that permits inward movement of said slide bars;

an actuating lever having a first end connected pivotally to said slide block to move said slide block to said locking position; and an elastic member for biasing said slide block toward said unlocking position;

wherein said slide block includes a resilient portion to contact said inner ends of said slide bars in said unlocking position, and a non-resilient blocking portion to contact said inner ends of said slide bars in said locking position.

3. The lockable case as claimed in claim 2, wherein said resilient portion of said slide block includes left and right wing members, said slide bars respectively abutting against said left and right wing members in said unlocking position.

4. The lockable case as claimed in claim 1, wherein each of said first lateral walls includes an engaging hole, said locking element including a projection that engages said engaging hole when said top cover closes said base casing.

5. The lockable case as claimed in claim 1, wherein said actuating lever further has a second end opposite to said first end and proximate to one of said second lateral walls, said one of said second lateral walls having a lock hole proximate to said second end of said actuating lever, said operating lock including a key element passing through said lock hole to operate said second end of said actuating lever.

* * * * *